United States Patent
Smith, Jr. et al.

(10) Patent No.: US 10,272,950 B1
(45) Date of Patent: Apr. 30, 2019

(54) LOAD SUPPORT DECK FOR CARGO CARRYING VEHICLE

(71) Applicant: Extreme Trailers, LLC, Dover, OH (US)

(72) Inventors: Leslie A Smith, Jr., Alliance, OH (US); Ryan L Rummell, Bowerston, OH (US)

(73) Assignee: EXTREME TRAILERS LLC, Dover, OH (US)

( * ) Notice: Subject to any disclaimer, the term of this patent is extended or adjusted under 35 U.S.C. 154(b) by 0 days.

(21) Appl. No.: 15/680,890

(22) Filed: Aug. 18, 2017

Related U.S. Application Data

(60) Provisional application No. 62/378,523, filed on Aug. 23, 2016.

(51) Int. Cl.
*B62D 21/20* (2006.01)
*B62D 33/02* (2006.01)
*B62D 53/06* (2006.01)
*B62D 25/20* (2006.01)

(52) U.S. Cl.
CPC ......... *B62D 21/20* (2013.01); *B62D 25/2054* (2013.01); *B62D 33/02* (2013.01); *B62D 53/061* (2013.01)

(58) Field of Classification Search
CPC .... B62D 21/20; B62D 25/2054; B62D 33/02; B62D 53/061
USPC ...................................................... 296/184.1
See application file for complete search history.

(56) References Cited

U.S. PATENT DOCUMENTS

| | | | |
|---|---|---|---|
| 1,708,753 A | 4/1929 | Dalton | |
| 1,957,497 A | 5/1934 | Galanot | |
| 2,277,615 A | 3/1942 | Townsend | |
| 2,356,008 A | 8/1944 | Schafer | |
| 2,490,532 A | 12/1949 | Glenway, Jr. | |
| 2,534,501 A * | 12/1950 | Coleman | B62D 25/2054 105/407 |
| 2,600,140 A | 6/1952 | Torseth | |
| 2,622,918 A | 8/1956 | Nallinger | |
| 2,758,870 A | 8/1956 | Nallinger | |
| 2,769,661 A | 11/1956 | Schonrock | |
| 2,791,439 A | 5/1957 | Swanson | |
| 2,812,192 A | 11/1957 | Cole | |
| 2,815,980 A | 12/1957 | Harbers et al. | |
| 2,844,864 A | 7/1958 | Schilberg | |
| 2,861,837 A | 11/1958 | Morse | |
| 3,042,423 A | 7/1962 | Bock | |
| 3,062,338 A | 11/1962 | De Ridder et al. | |
| 3,066,394 A | 12/1962 | Litzka | |
| 3,088,420 A * | 5/1963 | Faverty | B61D 17/10 105/422 |
| 3,100,556 A * | 8/1963 | De Ridder | F16B 5/008 52/283 |
| 3,123,017 A | 3/1964 | Konig et al. | |

(Continued)

*Primary Examiner* — Gregory A Blankenship
(74) *Attorney, Agent, or Firm* — Ralph E. Jocke; Walker & Jocke

(57) ABSTRACT

A cargo carrying vehicle (10) includes a load support deck (44). The deck is comprised of a plurality of laterally adjacent deck pieces (46). Each deck piece includes in transverse cross section a plurality of elongated cavities (56). A respective support member (100) is selectively longitudinally positionable in a respective cavity adjacent to a load area to provide additional strength and crush resistance.

24 Claims, 14 Drawing Sheets

(56) References Cited

U.S. PATENT DOCUMENTS

| | | |
|---|---|---|
| 3,175,284 A | 3/1965 | Cotovsky |
| 3,260,438 A | 7/1966 | Bergantini |
| 3,274,450 A | 9/1966 | Siebold |
| 3,283,464 A | 11/1966 | Litzka |
| 3,295,197 A | 1/1967 | Bunn et al. |
| 3,319,393 A | 5/1967 | Tantlinger et al. |
| 3,355,043 A | 11/1967 | Talbert |
| 3,380,216 A | 4/1968 | Spence |
| 3,434,198 A | 3/1969 | Bergantini |
| 3,460,235 A | 8/1969 | Roberts et al. |
| 3,481,627 A | 12/1969 | Felburn |
| 3,552,798 A | 1/1971 | Cole et al. |
| 3,579,832 A | 5/1971 | Cooper, Jr. |
| 3,612,569 A | 10/1971 | Marinelli |
| 3,622,194 A | 11/1971 | Bryk |
| 3,630,694 A | 12/1971 | Enright et al. |
| 3,664,816 A | 5/1972 | Finnegan |
| 3,699,870 A | 10/1972 | Cantagallo et al. |
| 3,705,732 A | 12/1972 | Marinelli |
| 3,733,849 A | 5/1973 | Cantagallo et al. |
| 3,777,438 A | 12/1973 | Brown |
| 3,807,759 A | 4/1974 | Vornberger |
| 3,829,148 A | 8/1974 | Stoneburner |
| 3,848,920 A | 11/1974 | Crosswell et al. |
| 3,872,577 A | 3/1975 | Kugler et al. |
| 3,886,705 A | 6/1975 | Cornland |
| 3,892,423 A | 7/1975 | Smith |
| 3,907,351 A | 9/1975 | Pozelt et al. |
| 3,909,059 A | 9/1975 | Benninger et al. |
| 3,960,405 A | 6/1976 | DeLong |
| 3,975,612 A | 8/1976 | Nakazaki |
| 3,995,405 A | 12/1976 | Peterson |
| 3,999,346 A | 12/1976 | Fetherston |
| 4,054,316 A | 10/1977 | DeLong |
| 4,060,145 A | 11/1977 | Kingman et al. |
| 4,065,885 A | 1/1978 | Blick, III et al. |
| 4,084,834 A | 4/1978 | Becker |
| 4,104,840 A | 8/1978 | Heintz |
| 4,107,892 A | 8/1978 | Bellem |
| 4,111,485 A | 9/1978 | Martin |
| 4,126,354 A | 11/1978 | DeLong et al. |
| 4,145,080 A | 3/1979 | Miller et al. |
| 4,208,898 A | 6/1980 | Ames et al. |
| 4,212,405 A | 7/1980 | Schmidt |
| 4,226,465 A | 10/1980 | McCullough |
| 4,232,884 A | 11/1980 | DeWitt |
| 4,273,381 A | 6/1981 | Bibeau et al. |
| 4,281,235 A | 7/1981 | Peloquin |
| 4,288,957 A | 9/1981 | Meehan |
| 4,294,638 A | 10/1981 | Rasmussen |
| 4,315,707 A | 2/1982 | Fernbach |
| 4,356,675 A | 11/1982 | Reicherts |
| 4,357,047 A | 11/1982 | Katz |
| 4,437,699 A | 3/1984 | Lewis et al. |
| 4,456,413 A | 6/1984 | Pavlick |
| 4,460,205 A | 7/1984 | Glance |
| 4,534,589 A | 8/1985 | Booher |
| 4,546,969 A | 10/1985 | Wilson |
| 4,564,233 A | 1/1986 | Booher |
| 4,586,646 A | 5/1986 | Booher |
| 4,612,744 A | 9/1986 | Shamash |
| 4,616,879 A | 10/1986 | Booher |
| 4,626,022 A | 12/1986 | Booher |
| 4,751,249 A | 6/1988 | Wycech |
| 4,758,128 A | 7/1988 | Law |
| 4,777,774 A | 10/1988 | Smalley, III |
| 4,787,669 A | 11/1988 | Wante |
| 4,787,670 A | 11/1988 | Bentz |
| 4,800,619 A | 1/1989 | Hudak |
| 4,806,065 A | 2/1989 | Holt et al. |
| 4,877,293 A | 10/1989 | French et al. |
| 4,904,017 A | 2/1990 | Ehrlich |
| 4,907,735 A | 3/1990 | Ushioda et al. |
| 4,936,065 A | 6/1990 | Hutchinson |
| 4,940,279 A | 7/1990 | Abott et al. |
| 4,954,039 A | 9/1990 | Johnston et al. |
| 4,956,954 A | 9/1990 | Horgan, Jr. |
| 4,991,760 A | 2/1991 | Coryell |
| 5,007,791 A | 4/1991 | Boughton |
| 5,026,112 A | 6/1991 | Rice |
| 5,041,318 A | 8/1991 | Hulls |
| 5,042,395 A | 8/1991 | Wackerle et al. |
| 5,080,548 A | 1/1992 | Bratlie et al. |
| 5,140,913 A | 8/1992 | Takeichi |
| 5,170,605 A * | 12/1992 | Huddle ............... B60P 3/20 |
| | | 52/588.1 |
| 5,185,193 A | 2/1993 | Phenicie |
| 5,204,149 A | 4/1993 | Phenicie |
| 5,210,921 A | 5/1993 | Booher |
| 5,336,027 A | 8/1994 | Paddock |
| 5,345,737 A | 9/1994 | Latchinian |
| 5,354,165 A | 10/1994 | Booher |
| 5,401,129 A | 3/1995 | Eatinger |
| 5,403,062 A | 4/1995 | Sjostedt et al. |
| 5,403,063 A | 4/1995 | Sjostedt et al. |
| 5,425,608 A | 6/1995 | Reitnouer |
| 5,433,501 A | 7/1995 | Thomas et al. |
| 5,449,081 A | 9/1995 | Sjostedt et al. |
| 5,474,331 A | 12/1995 | Booher |
| 5,476,348 A | 12/1995 | Shelleby |
| 5,507,405 A | 4/1996 | Thomas et al. |
| 5,515,902 A | 5/1996 | Hoffman |
| 5,553,906 A | 9/1996 | Kunz |
| 5,588,693 A | 12/1996 | Higginson et al. |
| 5,608,999 A | 3/1997 | McNamara |
| 5,613,726 A | 3/1997 | Hobbs |
| 5,622,116 A | 4/1997 | Carlton |
| 5,642,827 A | 7/1997 | Madsen |
| 5,655,792 A | 8/1997 | Booher |
| 5,658,120 A | 8/1997 | Watanabe |
| 5,664,826 A | 9/1997 | Wilkens |
| 5,674,556 A | 10/1997 | Fukumura et al. |
| 5,678,715 A | 10/1997 | Sjostedt et al. |
| 5,681,095 A | 10/1997 | Martin |
| 5,715,641 A | 2/1998 | Hall, Jr. |
| 5,730,485 A | 3/1998 | Sjostedt et al. |
| 5,741,042 A | 4/1998 | Livingston et al. |
| 5,791,726 A | 8/1998 | Kaufman |
| 5,794,397 A | 8/1998 | Ludwig |
| 5,810,501 A | 9/1998 | Ross |
| 5,816,423 A | 10/1998 | Fenton et al. |
| 5,820,192 A | 10/1998 | Yarnavick |
| 5,852,904 A | 12/1998 | Yu et al. |
| 5,860,377 A | 1/1999 | Akahane et al. |
| 5,860,693 A | 1/1999 | Ehrlich |
| 5,876,089 A | 3/1999 | Ehrlich |
| 5,927,915 A | 7/1999 | Grove, Sr. |
| 5,934,741 A | 8/1999 | Beukers et al. |
| 5,938,274 A | 8/1999 | Ehrlich |
| 5,944,349 A | 8/1999 | Bowling |
| 5,950,377 A | 9/1999 | Yoder |
| 5,954,465 A | 9/1999 | Ellerbush |
| 5,992,117 A | 11/1999 | Schmidt |
| 5,997,076 A | 12/1999 | Ehrlich |
| 6,065,261 A | 5/2000 | Fehr et al. |
| 6,095,715 A | 8/2000 | Hulls |
| 6,109,684 A | 8/2000 | Reitnouer |
| 6,174,023 B1 * | 1/2001 | Booher ............... 296/184.1 |
| 6,256,953 B1 | 7/2001 | Vulin |
| 6,316,384 B1 | 11/2001 | Brück et al. |
| 6,458,301 B1 | 10/2002 | Hendrix |
| 6,669,271 B2 | 12/2003 | Booher |
| 6,729,816 B2 | 5/2004 | Booher |
| 6,929,311 B2 | 8/2005 | Booher |
| 7,014,252 B2 | 3/2006 | Booher |
| 7,100,972 B2 | 3/2006 | Booher |
| 7,950,722 B2 | 5/2011 | Booher |
| 2006/0071506 A1 * | 4/2006 | Adams ............... B62D 21/20 |
| | | 296/184.1 |
| 2006/0088395 A1 | 4/2006 | Booher |
| 2007/0145702 A1 | 6/2007 | Booher |

(56) References Cited

U.S. PATENT DOCUMENTS

2009/0315297 A1* 12/2009 Nadeau .................. B62D 21/20
  280/407.1
2012/0104796 A1* 5/2012 Balaz ................... B62D 29/008
  296/184.1
2012/0169087 A1* 7/2012 Griffin ............... B62D 25/2054
  296/184.1

* cited by examiner

US 10,272,950 B1

LOAD SUPPORT DECK FOR CARGO CARRYING VEHICLE

TECHNICAL FIELD

Exemplary embodiments described herein relate to cargo carrying vehicles. Exemplary embodiments further relate to load supporting deck pieces for a cargo carrying vehicle that have improved strength, greater crush resistance and lighter weight.

BACKGROUND

Cargo carrying vehicles often include a deck upon which the cargo is supported. The cargo supporting deck must have sufficient strength to support the loads that result from the cargo being supported thereon without sustaining permanent deformation or damage. Components used for deck pieces of such cargo carrying vehicles may also sustain damage due to being crushed or deformed by concentrated forces produced by the cargo that is being carried. The deck pieces that make up a cargo supporting deck may also represent a substantial portion of the weight of the cargo carrying vehicle.

Cargo carrying vehicles and the cargo supporting decks thereof may benefit from improvements.

DETAILED DESCRIPTION

Figure 1:
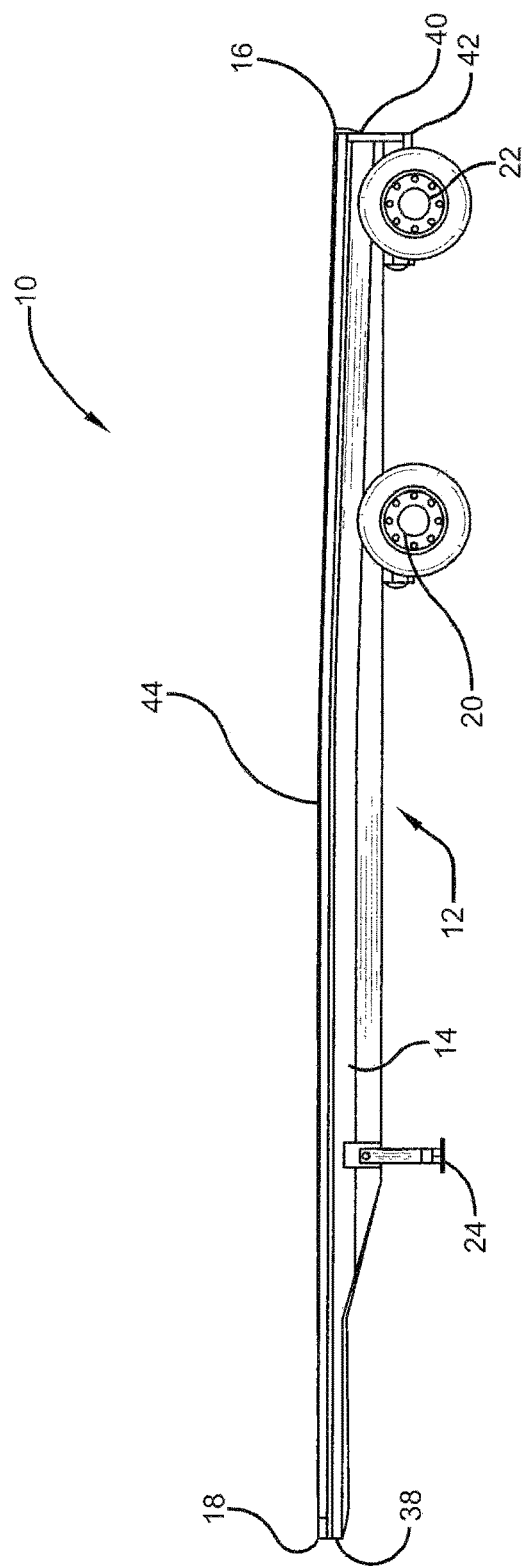
FIG. 1 is a side view of an exemplary cargo carrying vehicle in the form of a trailer.

Referring now to the drawings and particularly to FIG. 1, there is shown therein a cargo carrying vehicle 10. The exemplary cargo carrying vehicle comprises a trailer such as a road going trailer that is configured to be towed behind another vehicle such as a semi-tractor. However, it should be understood that this cargo carrying vehicle is exemplary and in other embodiments other types of cargo carrying vehicles may employ the principles and features discussed herein. Such vehicles may include, for example, truck beds, shipping containers, ships or other types of cargo carrying vehicles and structures that must support significant loads associated with cargo that is supported and/or transported.

Figure 2:
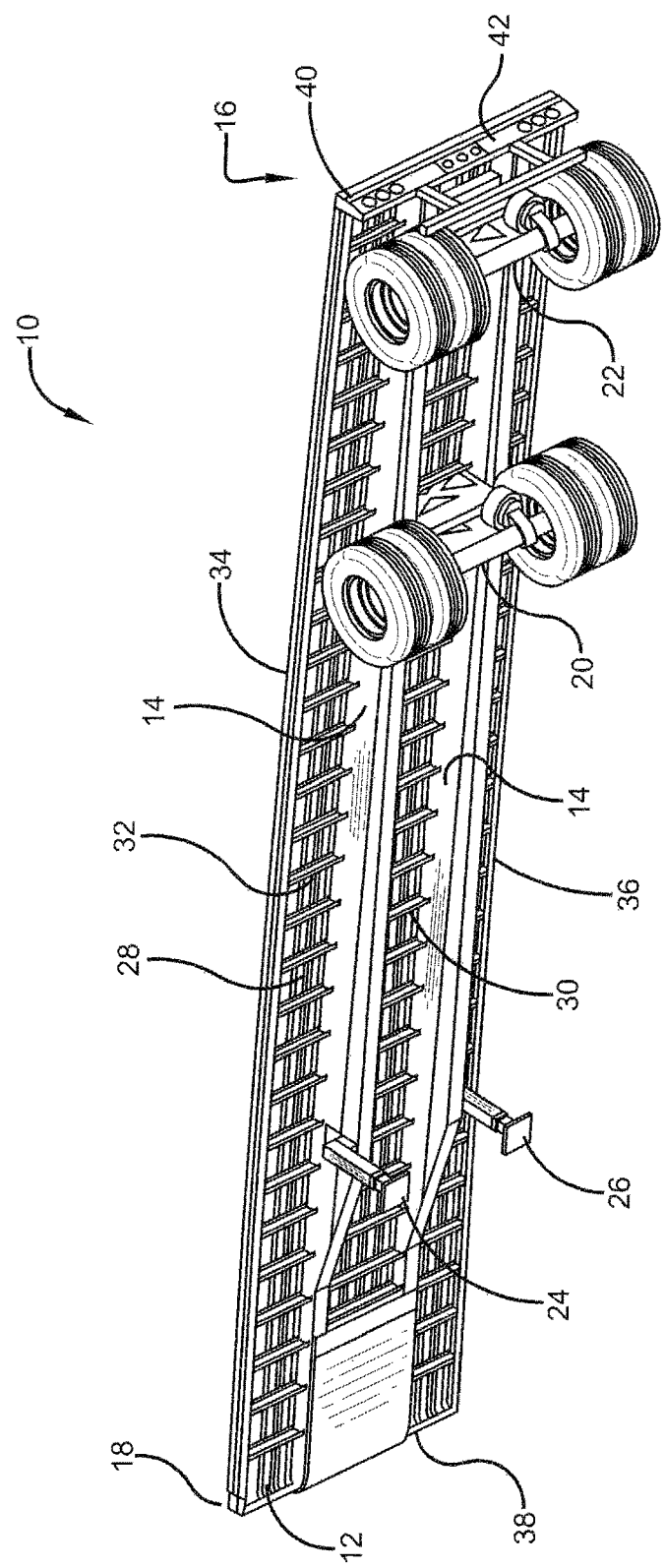
FIG. 2 is a bottom rear perspective view of the trailer shown in FIG. 1.
Figure 3:
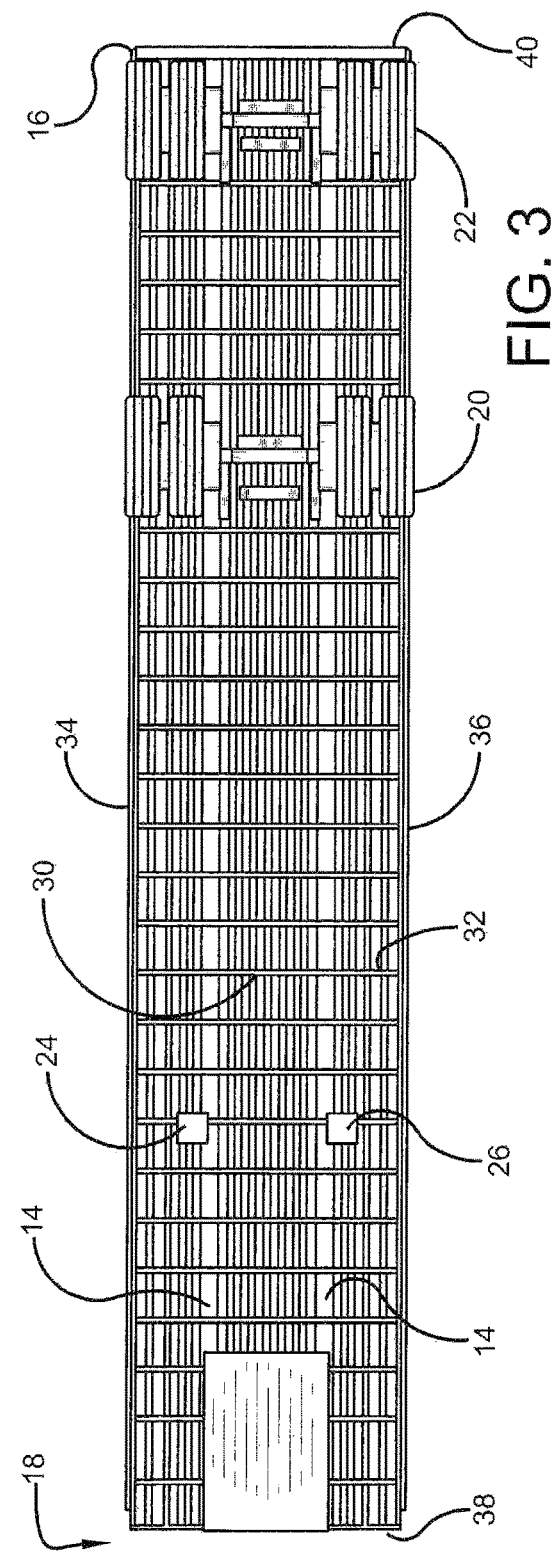
FIG. 3 is a bottom view of the trailer shown in FIG. 1.
Figure 4:
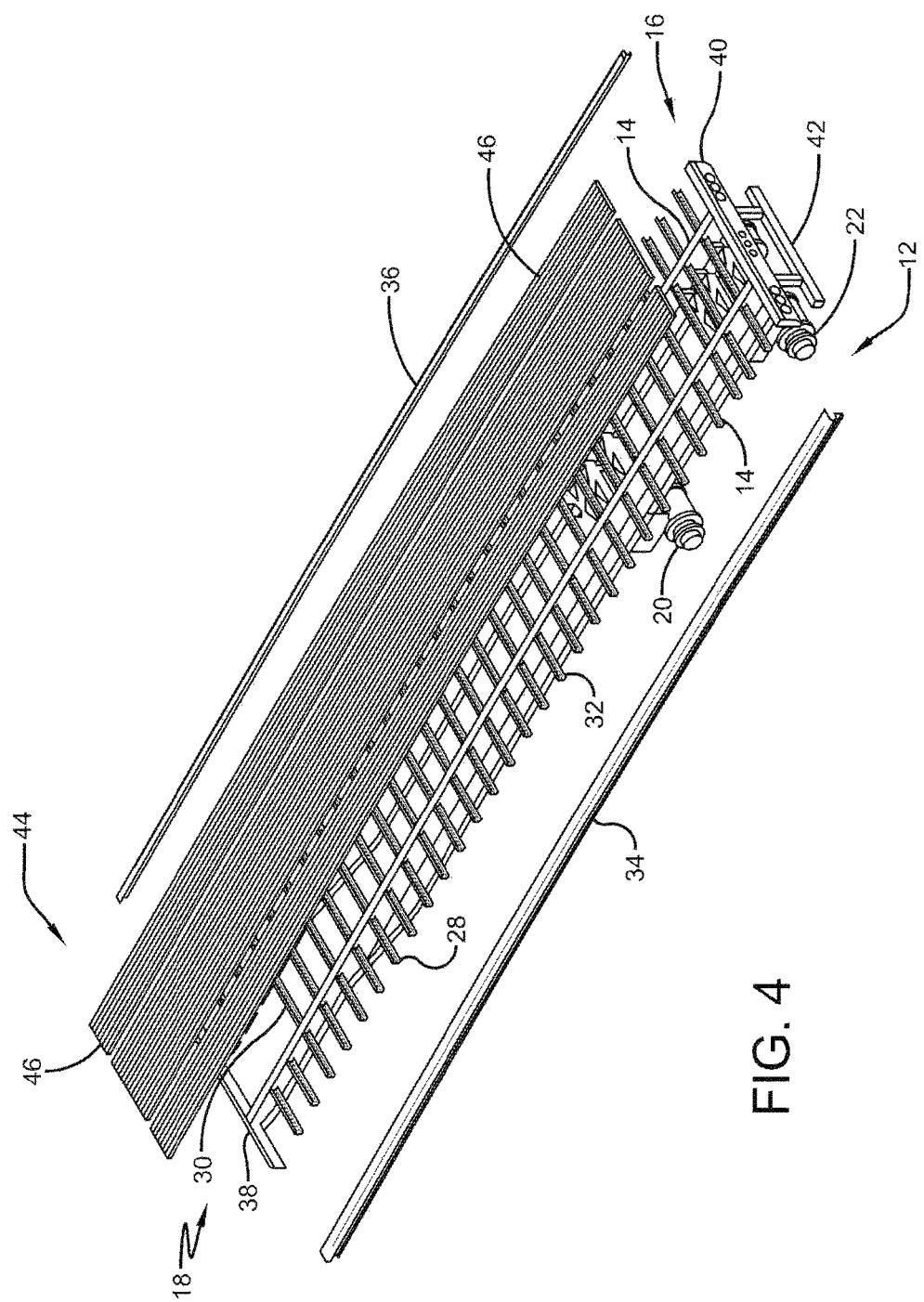
FIG. 4 is an exploded perspective view of the trailer.

The exemplary trailer 10 includes a frame 12. The exemplary frame 12 includes a pair of longitudinally elongated frame rails 14. As shown in FIGS. 2-4, the frame rails 14 extend substantially the entire length of the exemplary trailer. In the exemplary arrangement the frame rails 14 are substantially vertically thicker near the rear 16 of the trailer relative to the vertical thickness of the frame rails near the front 18 of the trailer.

The exemplary trailer includes a pair of axles 20 and 22. The axles are in operative connection with the frame rails 14 through respective subframe components. The exemplary embodiments of the subframe components include movable supports, air springs, shock absorbers and other suitable axle supporting components. Further, in exemplary embodiments the axles include tandem wheels and suitable braking components to enable over the road travel of the trailer.

The exemplary trailer further includes a pair of front supports 24, 26. The supports are selectively extendable to engage the pavement or other supporting surface on which the trailer is supported when the trailer is not being towed by a vehicle. The supports are selectively retractable so that they can be upwardly disposed from the pavement when the trailer is in connection with the tow vehicle.

The frame 12 of the exemplary trailer includes a plurality of cross members that are alternatively referred to herein as ribs 28. The ribs extend generally perpendicular to the frame rails. In the exemplary arrangement, central rib portions 30 span the area between the frame rails 14. Outboard rib portions 32 extend outside the frame rails. The outboard rib portions are engaged with frame side rails 34 and 36. The central and outboard rib portions, frame rails and side rails are joined together in fixed relation by welding or other fastening methods.

The exemplary frame further includes a front cross member 38 and a rear cross member 40. The front cross member 38 and the rear cross member 40 each extend perpendicularly relative to the frame rails 14 and between the end side rails 34, 36. The exemplary rear cross member has attached thereto, a guard 42 that is configured to block items from passing under the trailer. Further, the exemplary rear cross member includes vehicle taillights or other suitable features needed at the rear of the trailer. Of course it should be understood that these structures are exemplary. Further, exemplary trailers will also include a structure for releasable attachment of the trailer to a tow vehicle. This may include a trailer hitch, fifth wheel or other suitable engaging structure that enables the releasable engagement of the trailer and the vehicle which will provide the towing force to move the trailer. Of course it should be understood that these structures are exemplary and in other embodiments, different or additional structures may be utilized.

Figure 5:
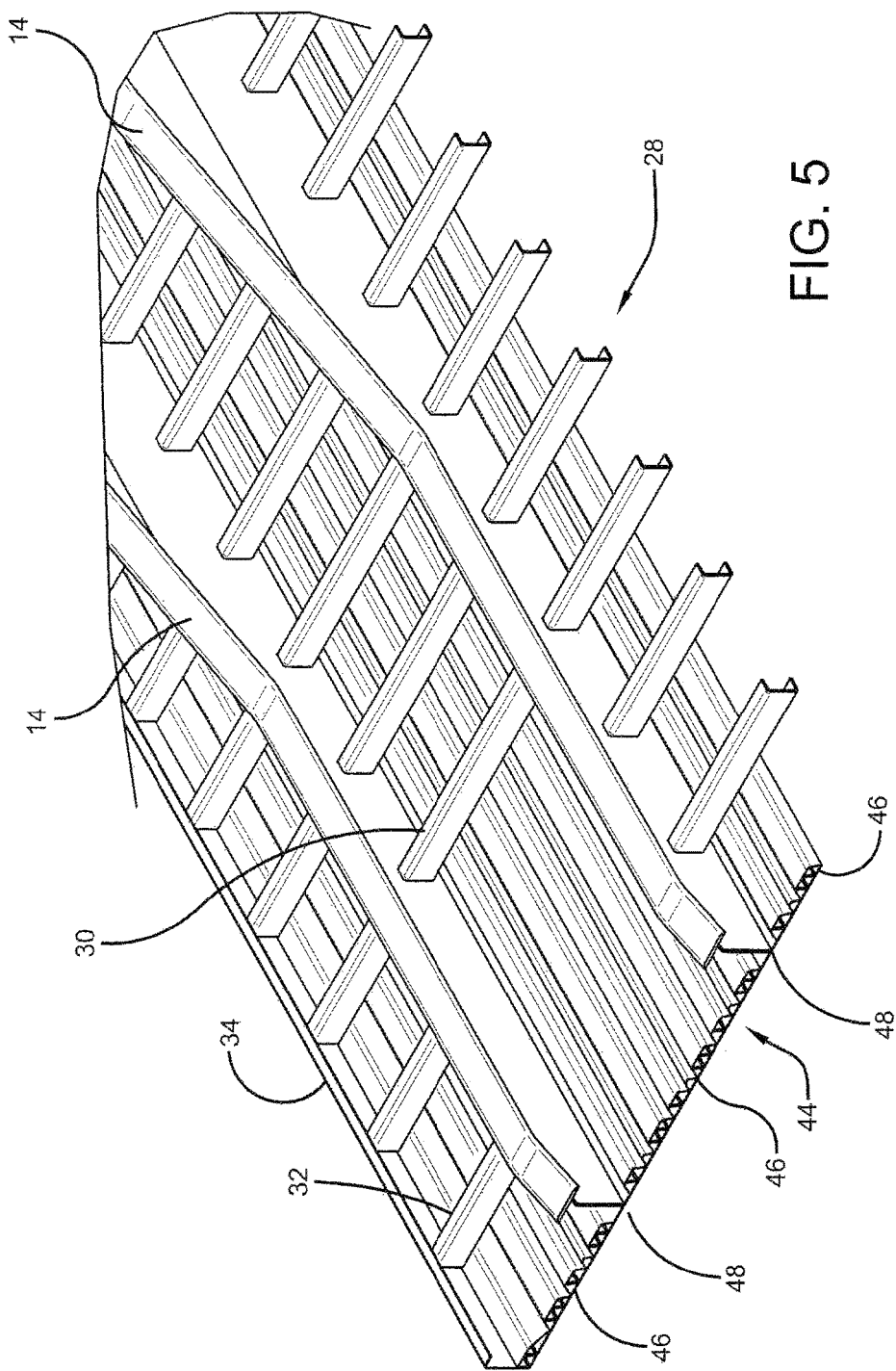
FIG. 5 is a bottom front partial perspective view of the trailer.

Trailer 10 includes a load supporting deck 44. The exemplary deck 44 includes a plurality of longitudinally elongated deck pieces 46. The exemplary deck pieces 46 are arranged in lateral side by side adjacent relation. Deck pieces may extend generally the entire longitudinal length of the vehicle or in selected portions thereof. As shown in FIGS. 4 and 5, the deck pieces extend in supported connection above the central rib portions 30 and the outboard rib portions 32. In the exemplary trailer construction, the upper surfaces 48 of the frame rails 14 extend generally at the same level as the upper surfaces of the deck pieces. As shown in FIG. 5, a plurality of deck pieces extend between the frame rails 14. Further, a plurality of deck pieces extend between each frame rail and each respective side rail 34, 36. Of course it should be understood that this frame and deck construction is exemplary and in other embodiments, other approaches may be used.

Figure 6:
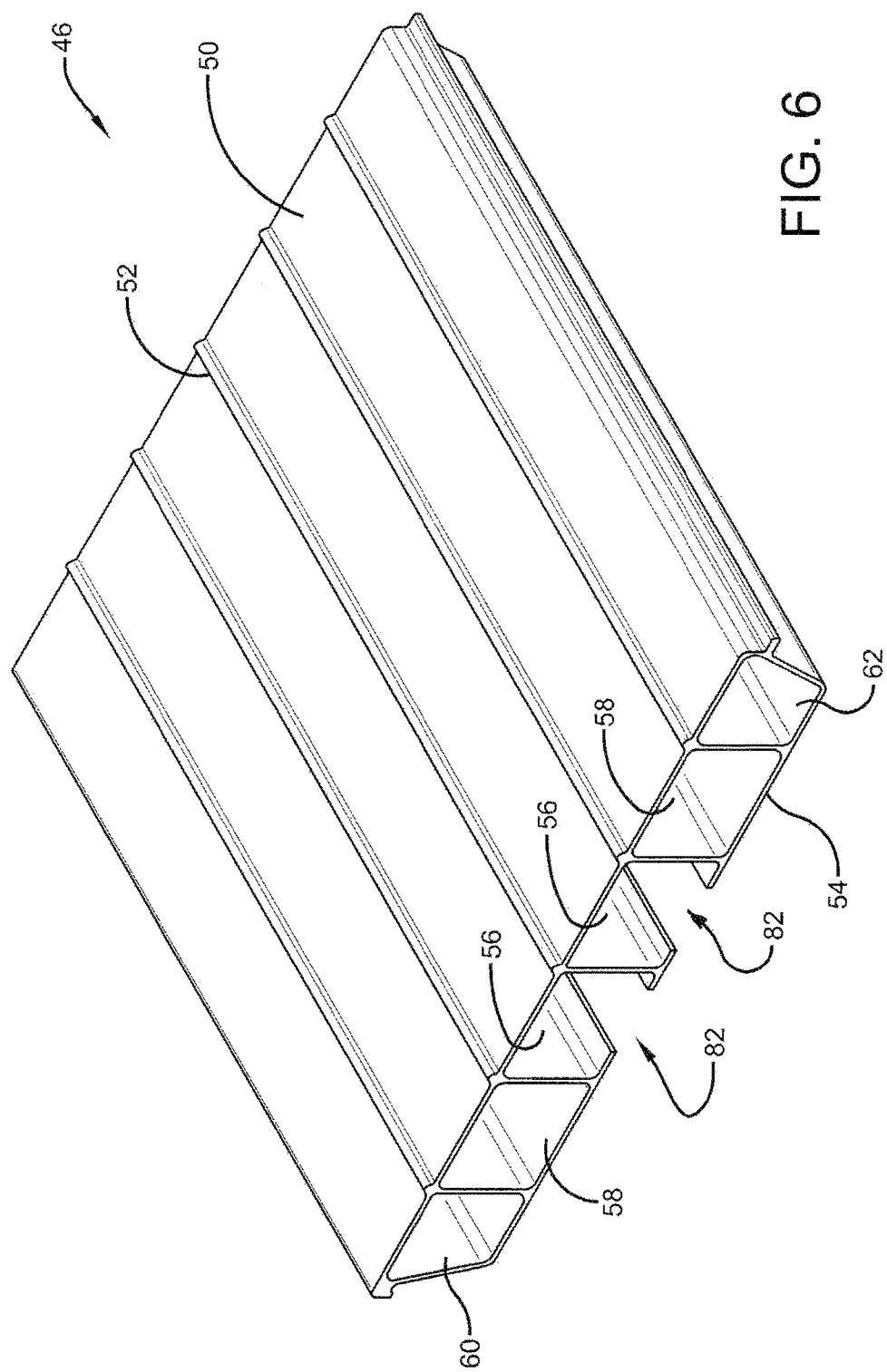
FIG. 6 is a front top perspective view of a portion of an exemplary deck piece utilized in the cargo supporting deck of the exemplary trailer.
Figure 7:
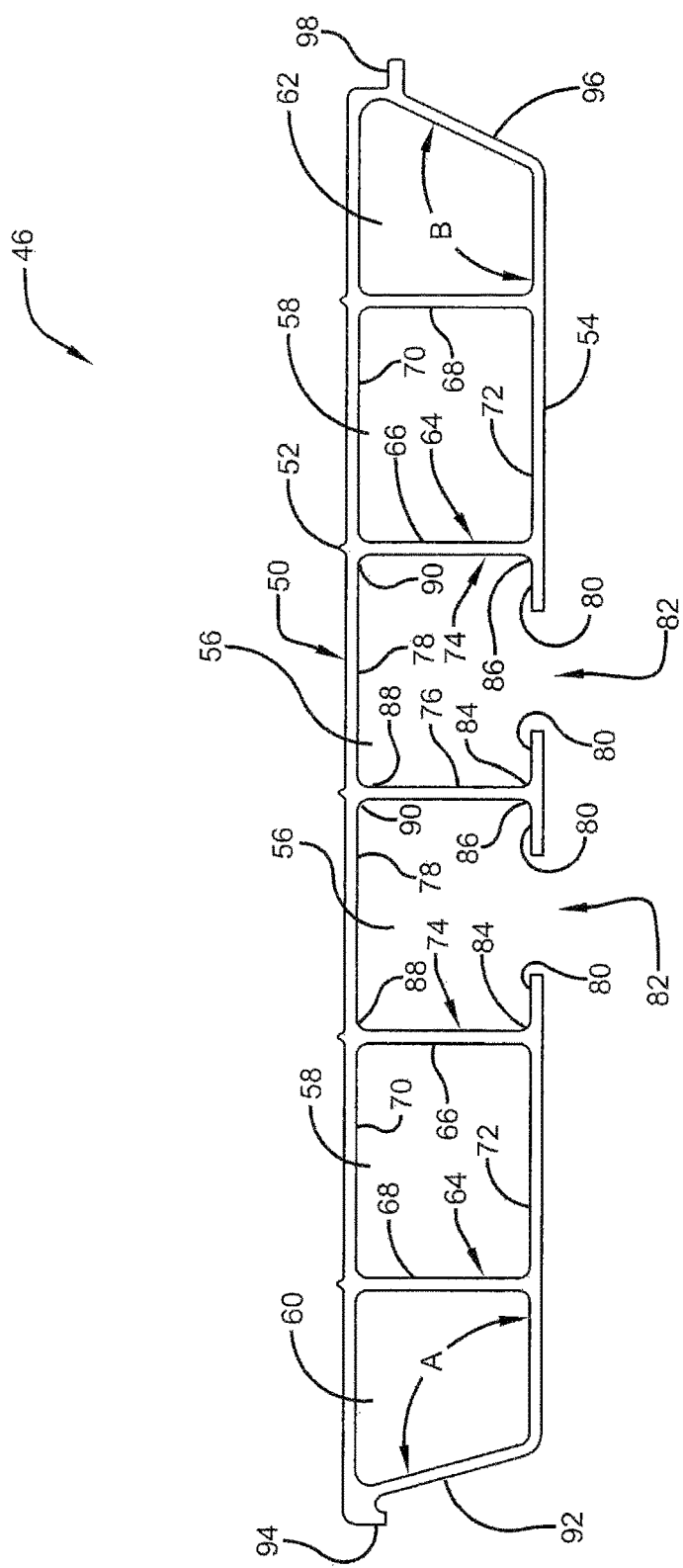
FIG. 7 is a front end view of the exemplary deck piece.

The exemplary deck 44 is comprised of the support deck pieces 46 a portion of which is shown in greater detail in FIGS. 6 and 7. Each deck piece includes a generally planar load engaging surface 50. In the exemplary arrangement, the load engaging surface includes a plurality of transversely spaced ribs 52 that extend outward therefrom. Ribs 52 help to make the load engaging surface 50 less slippery and also help to prevent lateral shifting of cargo items supported on the deck.

The exemplary deck piece further includes a back surface 54. The back surface 54 is disposed away from the load engaging surface 50.

The exemplary deck piece 46 further includes a plurality of laterally disposed cavities 56, 58, 60 and 62. Each of cavities 56, 58, 60 and 62 comprise longitudinally elongated parallel cavities that extend in the deck piece. Such cavities may be formed in exemplary embodiments in a deck piece that is of extruded construction of a suitably strong material such as aluminum 6061 alloy or other material. Of course it should be understood that this construction is exemplary and in other embodiments, other approaches and materials may be used.

The exemplary cavities 58 in transverse cross section comprise rectangular cavities that are bounded by at least one cavity wall surface 64. The cavity wall surface 64 of each cavity 58 includes vertically extending portions 66 and 68. Wall portions 66 extend adjacent to and bound cavities 56. Cavities 58 further include a top cavity wall portion 70 which is positioned adjacent to and beneath the load engaging surface 50. Cavities 58 further include a bottom cavity wall portion 72 which is adjacent to and extends inwardly of back surface 54.

In the exemplary deck piece 46, support cavities 56 in transverse cross section are also generally rectangular in shape. Each cavity 56 is bounded by a cavity wall surface generally indicated 74. In the exemplary arrangement, the cavity wall surface includes the adjacent vertically extending wall portion 66 of adjacent cavity 58. Cavities 56 also include a vertically extending central wall portion 76 that extends between the two cavities 56 in the exemplary embodiment.

Each exemplary cavity 56 further includes a top cavity wall portion 78. Cavity wall portion 78 is adjacent to and disposed inwardly from load engaging surface 50. Each cavity 56 further includes bottom cavity wall portions 80. The bottom cavity wall portions extend inwardly of the back surface 54 and partially across each respective cavity 56.

In the exemplary arrangement, the cavities 56 each include a longitudinally elongated gap 82. Each elongated gap 82 extends in the back wall 54 and into each respective cavity. Each gap is bounded at each lateral side by bottom cavity wall portions 80 which extend laterally from the vertical wall portions 74 and 76.

In the exemplary embodiment, the elongated gaps 82 reduce the amount of material which makes up the deck piece 46 and helps to reduce the weight thereof. Of course it should be understood that this approach is exemplary and in other arrangements, the gaps may extend in additional cavities of a deck piece or alternatively the cavities may not include gaps. Further, in other exemplary embodiments, the cavities that include gaps may not be adjacent to each other in the deck piece.

In exemplary embodiment the deck pieces are in operatively supported connection with the underlying ribs of the vehicle frame. Further, because the rib portions are welded or otherwise attached thereto, the rib portions constrain the wall portions 72 and 80 and help resist any lateral deformation of the deck portions which further provides enhanced resistance to deformation and greater load bearing capability.

In the exemplary deck piece 46, the at least one cavity wall surface of vertically extending wall portions 74 and 76, and bottom wall portions 80, define corner recesses 84 and 86. In the exemplary arrangement, the corner recesses 84 and 86 are formed as a generally right angle notch in each lateral internal lower side of cavity 56. Further in the exemplary arrangement, each cavity 56 further includes upper corner recesses 88 and 90. Each upper corner recess 88 and 90 is disposed adjacent to load engaging surface 50, and in the operative position of the deck piece 46 are disposed vertically above each of the respective corner recesses 84 and 86. Of course this configuration is exemplary and in other embodiments, other approaches may be used.

In the exemplary deck piece 46, end cavity 60 is generally similar to cavities 58 except that in transverse cross section it includes an angled end wall 92. Angled end wall 92 bounds end cavity 60 and extends from the back surface 54 toward the load engaging surface at an obtuse angle relative to the back surface, generally indicated A. Angled end wall 92 further includes in transverse cross section, a lateral projection 94. Lateral projection 94 is configured to extend in engaged abutting relation with an adjacent deck piece or other structure of the deck or frame.

The exemplary deck piece 46 also includes end cavity 62 at an opposed lateral end from end cavity 60. Similar to end cavity 60, end cavity 62 is bounded by an angled end wall 96. Similar to angled end wall 92 of end cavity 60, angled end wall 96 in transverse cross section extends from the back surface 54 toward the load engaging surface at an obtuse angle relative to the back surface, generally indicated B. Angled end wall 96 further includes a lateral projection 98. Lateral projection 98 is also configured to extend in engaged relation with the laterally adjacent frame or deck piece similar to deck piece 46. In the exemplary arrangement, lateral projection 94 is configured to vertically overlie lateral projection 98 of an adjacent deck piece. Such overlying relation helps to laterally position the deck pieces and avoid vertical gaps that would otherwise extend between the adjacent deck pieces. Of course, this configuration is exemplary and in other embodiments, other approaches may be used.

The exemplary end cavities 60 and 62 of the deck piece 46 and angled wall portions 92 and 96 thereof are so configured to reduce the amount of material that is included in each deck piece and to reduce the weight thereof. Of course it should be understood that in other embodiments, other configurations of the end cavities or other deck piece structures may be utilized for purposes of reducing weight or providing suitable strength and crush resistance.

Figure 8:
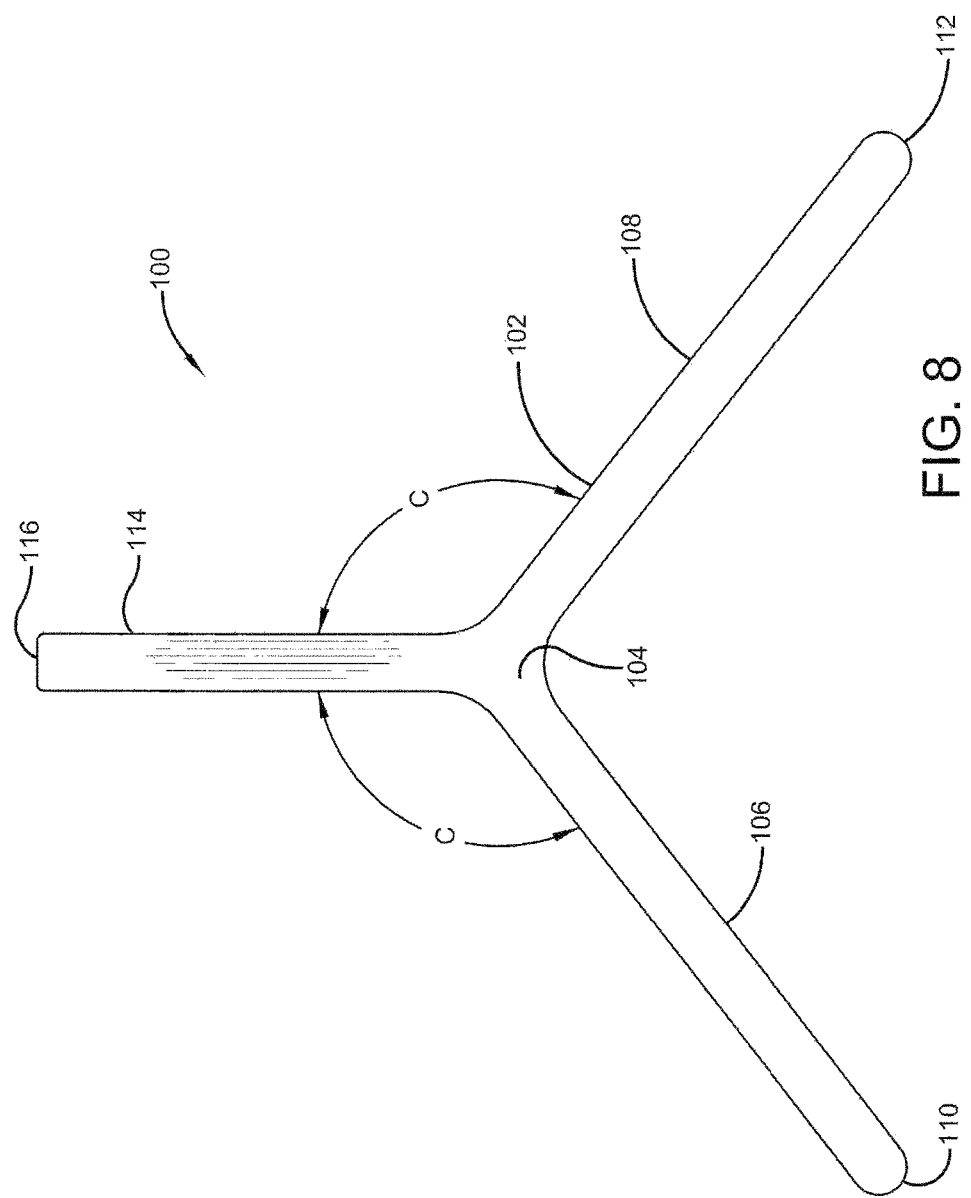
FIG. 8 is a front view of an exemplary support member used in conjunction with the deck piece.

In exemplary embodiments, cavities 56 of the deck piece 46 are configured to accept\therein a respective support member 100. As shown in transverse cross section in FIG. 8, the exemplary support member 100 is comprised of a unitary body 102 which includes a central apex portion 104. A pair of divergent legs 106, 108 extend outward in a first direction from apex portion 104. The exemplary leg 106 terminates in a rounded distal end 110 while leg 108 terminates at a rounded distal end 112. In the exemplary embodiment, the legs 106 and 108 are divergent at an angle of approximately 105 degrees. Of course this configuration is exemplary.

The exemplary support member further includes a central strut 114. The central strut extends from the apex portion 104 in a second direction opposed of the first direction and terminates at a generally flattened distal end 116. The central strut 114 extends at a common angle generally indicated C relative to each of legs 106 and 108. In the exemplary embodiment, the common angle C is about 127 degrees. Of course this configuration is exemplary.

Figure 9:
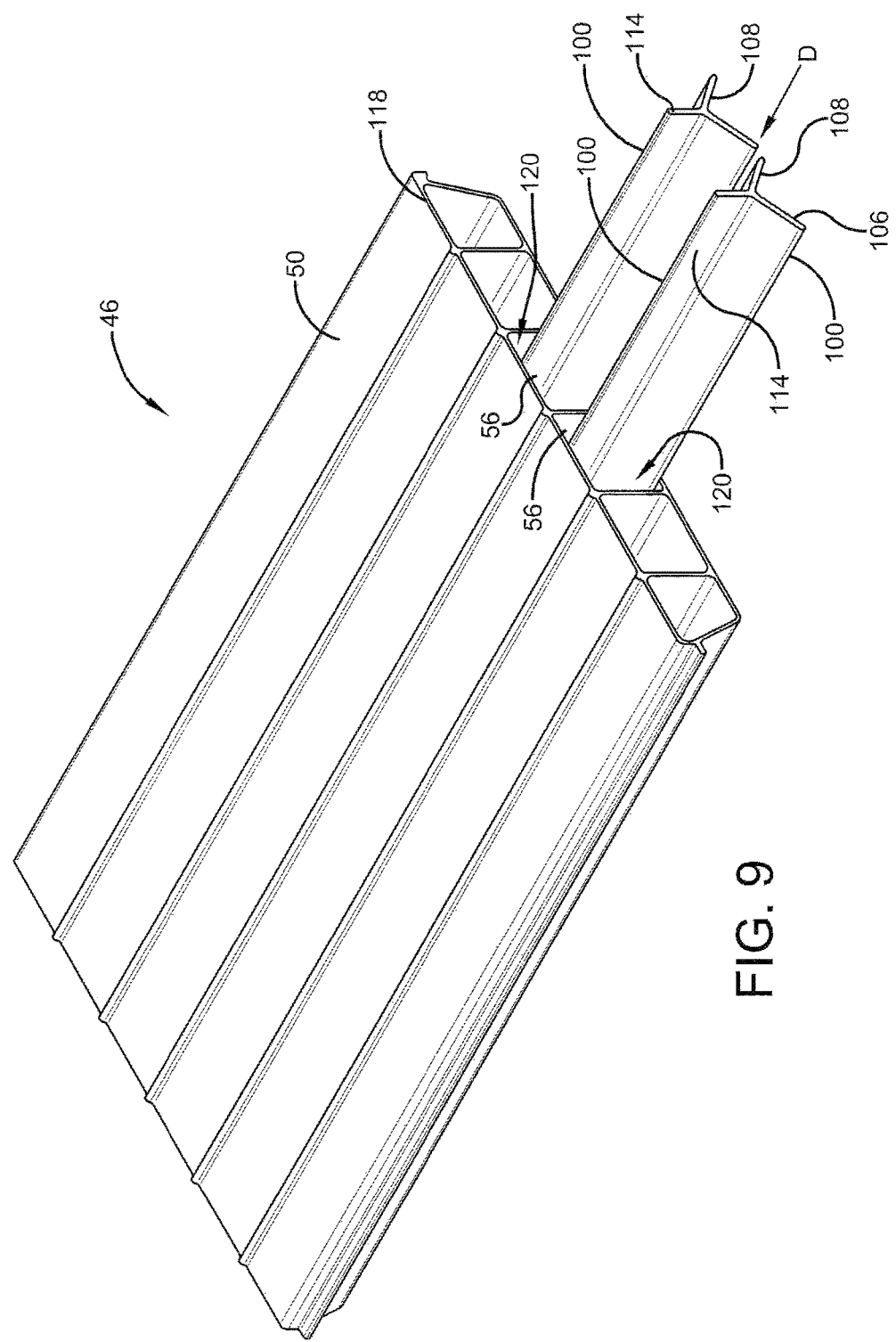
FIG. 9 is a left front top perspective view of an exemplary deck piece with support members extending in elongated cavities therein.
Figure 10:
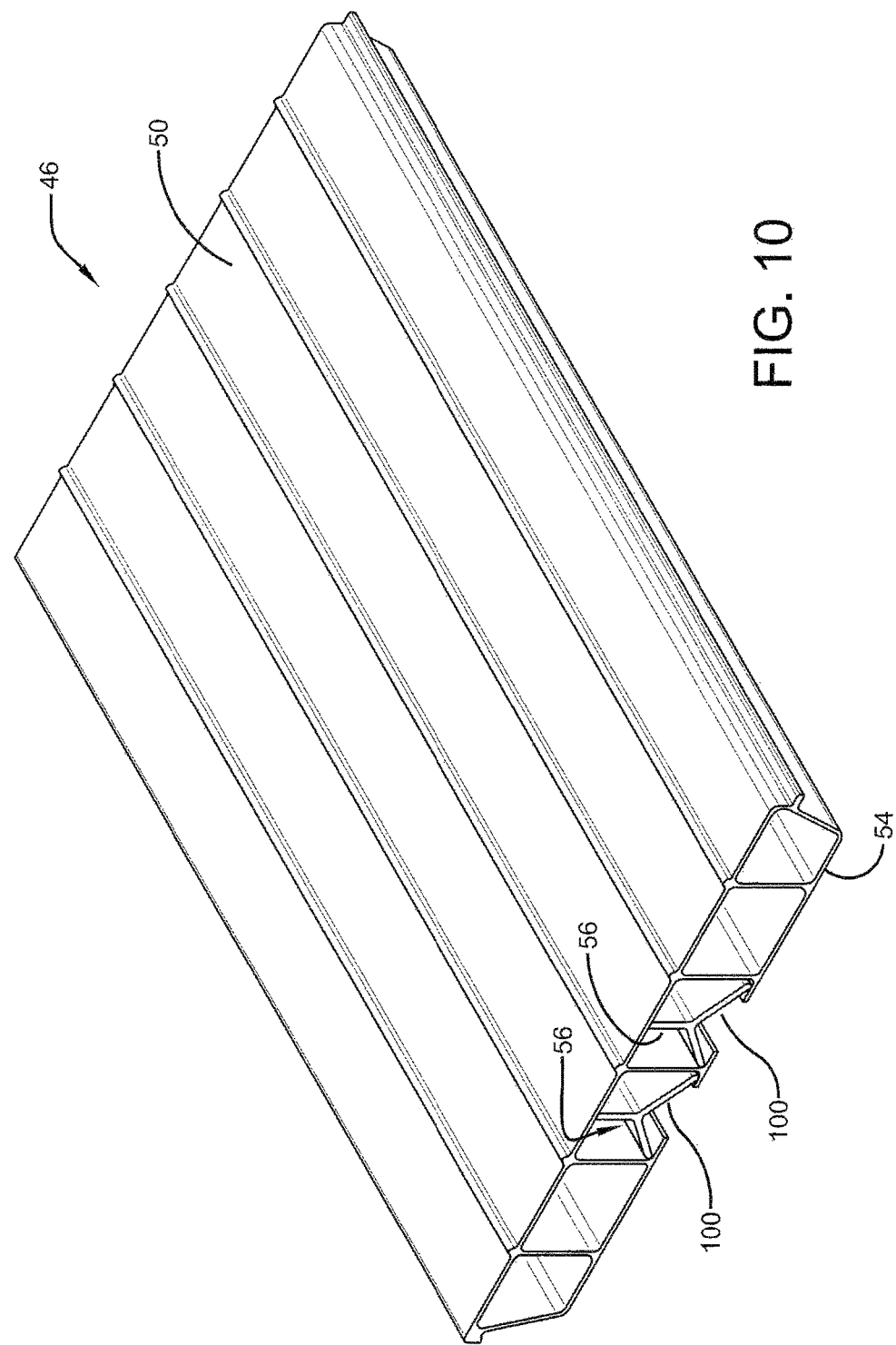
FIG. 10 is a right front top perspective view of the deck piece with the support members positioned therein.
Figure 11:
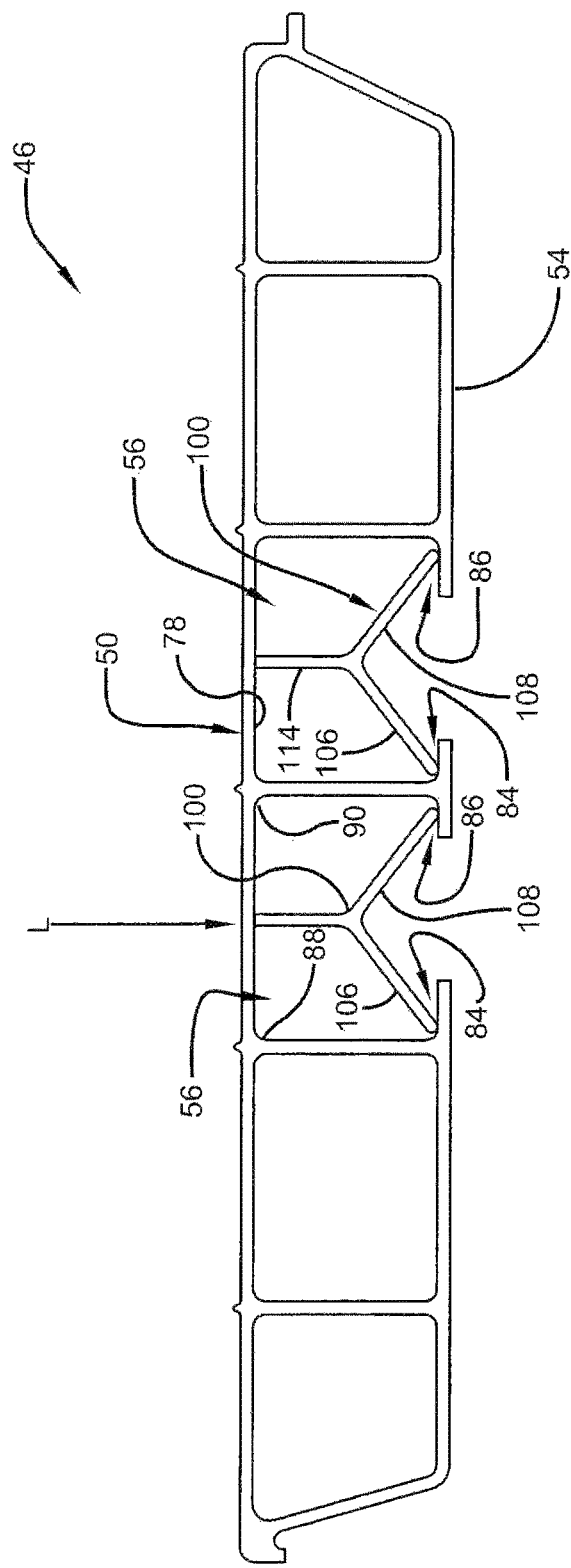
FIG. 11 is a front end view of the exemplary deck piece with the support members positioned therein.

As shown in FIGS. 9 and 11, the exemplary support members 100 are configured to be selectively longitudinally movably positionable within each cavity 56 of the deck piece 46. As shown in FIG. 9, deck piece 46 at a longitudinal end thereof 118 provides an opening 120 into each cavity 56. Each support member 100 is insertable into a respective cavity 56 through the respective cavity opening. As shown in FIGS. 9-11, the support members 100 are inserted such that the ends 111, 112 of legs 106 and 108 extend in longitudinally movable relative contacting relation with the corner recesses 84 and 86 of each cavity. In the exemplary arrangement, the leg ends are enabled to slide in the respective corner recesses longitudinally in the respective cavity 56 in the direction of Arrow D in FIG. 9.

In the exemplary arrangement, the flattened end 116 of the central strut 114 engages the top cavity wall portion 78 of the cavity 56 in which the support member is positioned. The central strut end engages the top cavity wall portion intermediate of the corner recesses 88 and 90 which bound each cavity. In the exemplary arrangement, the central strut engages the top cavity wall portion generally at the midpoint between the top corner recesses 88 and 90. Of course it should be understood that this configuration is exemplary and in other embodiments, other approaches may be used.

Each elongated support member is longitudinally extended within a respective cavity 56 so that the support members are positioned within the cavities as shown in FIG. 10. In exemplary arrangements, the support members may extend the entire length of the cavity 56. Alternatively the support members may be included only in those longitudinal areas of the cavity 56 where a high load is applied and where additional strength and crush resistance are required. For example, in some exemplary arrangements the support members may be pushed longitudinally inwardly into the respective cavity using a suitable dowel or other structure extended through the end opening until the support member is positioned in the desired longitudinal location within the deck piece. Further, as can be appreciated, the support members may be positioned in the same longitudinal region for all adjacent deck pieces based on the need to have crush resistance and added support in common load areas of the trailer deck. Alternatively the load areas may be disposed in various disposed locations of the deck and the support members may be arranged in different longitudinal positions for purposes of better supporting the load in such disposed areas. Of course the approach that is taken will depend on the particular load bearing requirements of the particular cargo supporting deck structure.

Figure 12:
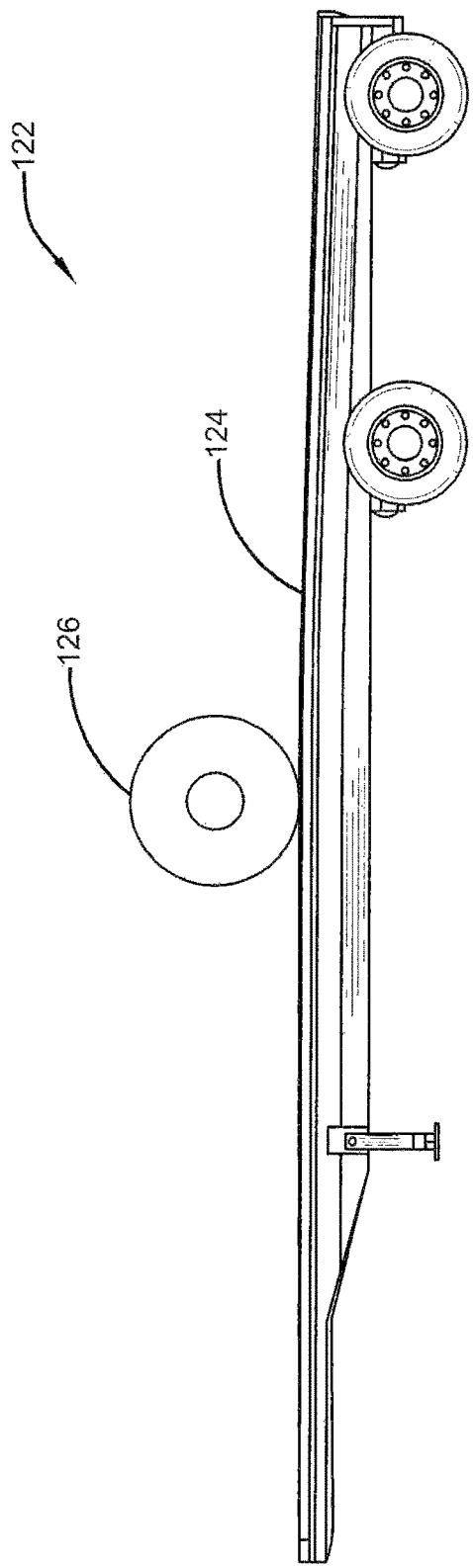
FIG. 12 is a side view of an exemplary trailer carrying cargo in the form of a round coil such as a steel coil or similar article.
Figure 13:
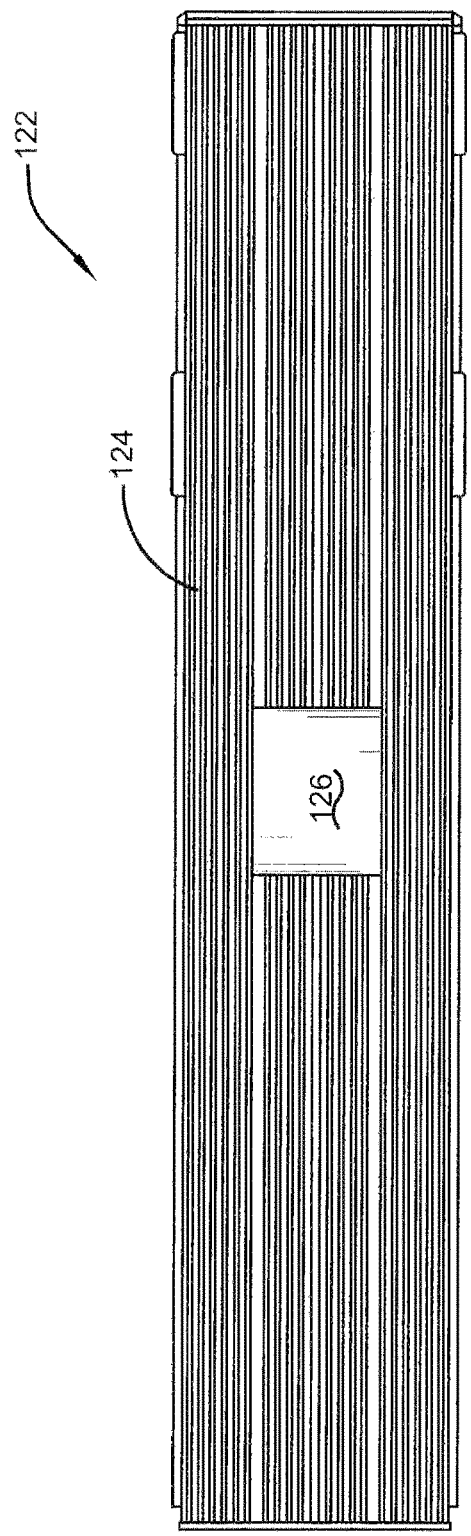
FIG. 13 is a top view of the trailer and cargo shown in FIG. 12.
Figure 14:
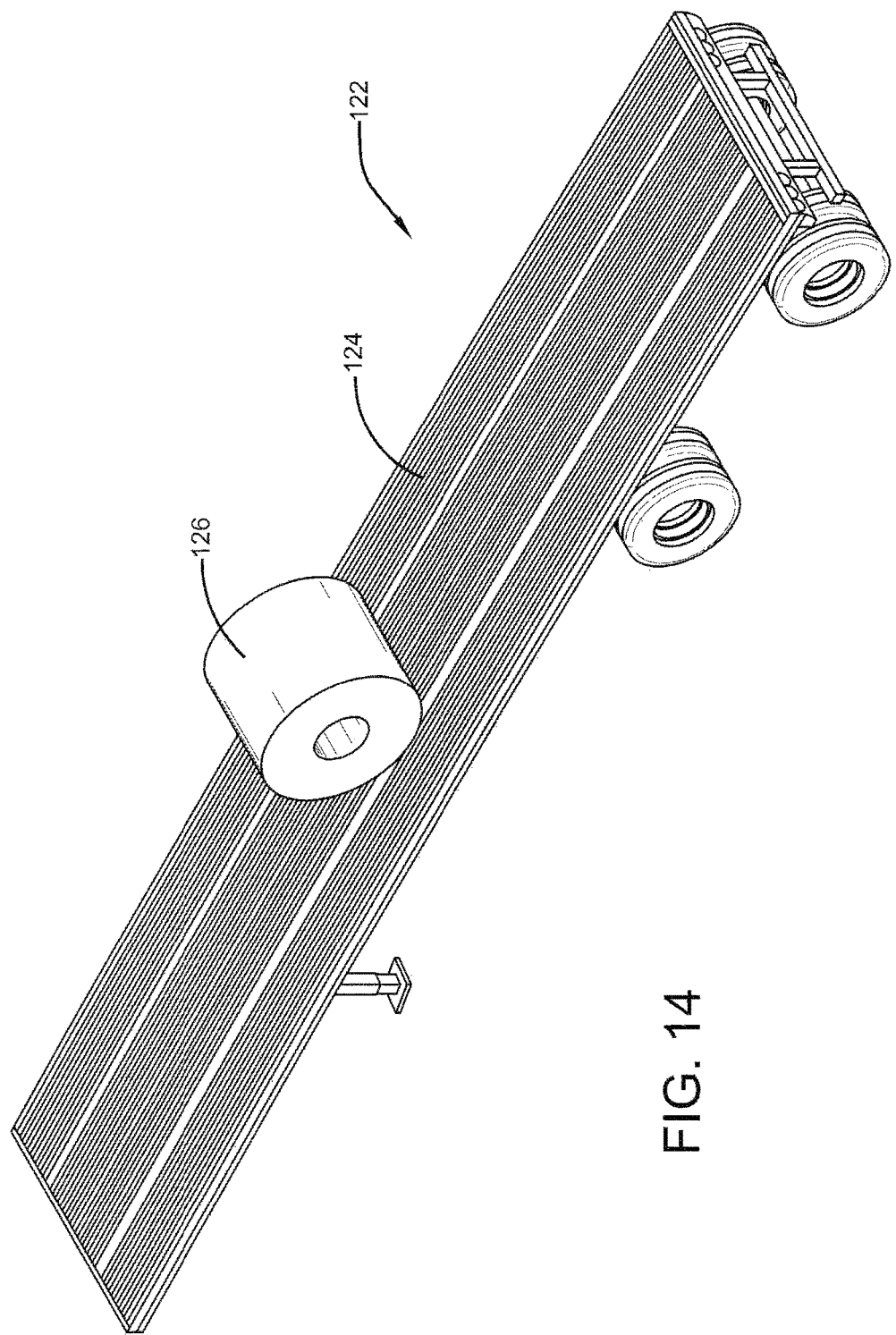
FIG. 14 is a right rear top perspective view showing the trailer and the cargo of FIG. 12.

FIGS. 12-14 demonstrate the principles of the exemplary embodiment applied in an exemplary load supporting application. FIGS. 12-14 show a trailer 122. Trailer 122 is generally similar to trailer 10 except as otherwise specifically described. Trailer 122 includes a load supporting deck 124. Load supporting deck in the exemplary embodiment is comprised of deck pieces similar to deck pieces 46 previously described.

Trailer 122 includes a concentrated load 126 in engagement with the deck 124 and the load supporting surfaces 50 of the deck pieces. In the exemplary arrangement, the load 126 may include a heavy steel coil or other relatively massive load that has its weight concentrated in a relatively small area of the load supporting deck 124.

The force resulting from gravity on the load 126 acts on the load engaging surface 50 of the deck pieces in a load area as represented by Arrow L in FIG. 11. As can be appreciated, the load in the exemplary arrangement is distributed over a relatively small lateral and longitudinal area relative to the overall surface area of the load supporting deck 124. In this exemplary arrangement, the cavities and support members which underlie the load area provide additional strength and rigidity to the deck. The deck piece cavity and support structures also provide enhanced crush resistance and avoid the deformation thereof in the load area.

Further, as can be appreciated from this example, such additional strength and crush resistance may only be necessary in the load area where the force of the load 126 is applied. As a result, the support members may not be required in the cavities in other areas of the deck pieces that are disposed away from the load area. The ability of the exemplary embodiment to avoid the need for the additional weight of the support members where the additional strength and crush resistance is not needed, reduce the weight of the trailer or other cargo carrying vehicle which provides for improved fuel economy and other desirable properties.

As can be appreciated, different types of cargo carrying vehicles may have load areas in numerous different areas of the cargo supporting deck or other load supporting structures. The exemplary embodiments enable the load supporting areas to be reinforced by the inclusion of the support members within the cavities of the deck piece structures in the areas where support is needed. Further, such support members can be selectively arranged so as to provide the additional strength in the areas where it is needed.

Further, in exemplary embodiments the cargo supporting deck pieces can have the support members initially arranged and/or reconfigured as necessary to help strengthen the load areas that require additional support due to the need to haul different arrangements or types of cargo. The exemplary arrangements enable the support members to be positioned, and also removed and repositioned so as to provide the additional support in load areas that require it for different cargo configurations. This enables the structure of some exemplary embodiments to be more versatile and used for moving more types of cargo while maintaining the strength and rigidity of the vehicle structure.

It should be understood that while in the exemplary embodiments the deck pieces include cavities that are generally rectangular in transverse cross section, in other embodiments other cavity configurations and arrangements may be used. Such cavities may have other shapes which are sized and suitably configured for receiving selectively positionable longitudinal support members. Further, it should be understood that the configuration of the support members including the pair of divergent legs and central strut is exemplary of support structures that may be utilized. Other support structure configurations may be utilized for purposes of providing contacting relation in a plurality of locations with at least one cavity wall that bounds a particular cavity. Such support members may include other different configurations in transverse cross section such as V-shaped members, diamond shaped members, triangular shaped members, I-beam shaped members, or other members that are suitable for providing additional support at selected longitudinal locations within the cavity configuration. In exemplary arrangements, the support members may comprise structures comprised of a plurality beam portions and/or hollow cross sections to supply support while minimizing the weight of the support members.

In other exemplary embodiments, support members like that shown in the previously described exemplary embodiment may be used in an orientation that is inverted from the orientation previously shown. For example, the divergent pair of legs may be oriented so as to extend upwardly from an apex portion which is the area of the support member where the legs of the support member come together. Further in some alternative exemplary arrangements support pieces may be configured in a V shape with the legs extending in a direction either upwardly or downwardly from the apex portion. In such arrangements in lieu of a central strut, the apex portion may define an end on an opposed side of the legs that is in contacting longitudinally movable relation with an adjacent laterally extending surface of a cavity wall. In some exemplary arrangements where the at least one wall bounding the cavity includes a gap, the laterally extending surface in engagement with the end disposed at the apex portion, may be on a side of the cavity that is vertically opposite the gap. In other exemplary arrangements support members may include leg portions or member portions that are curved, straight or that include members that are both curved and straight. Numerous different support members and corresponding cavity shapes may be utilized.

Further in some arrangements deck pieces may be utilized that include cavities in transverse cross-section that serve to provide cavities for gas flow, cooling or other functions that are useful in connection with the particular cargo that is to be supported by the deck piece. For example in some container arrangements it may be useful to enable the air or other gas within the container to be in contact with more of the material supported on the support deck than would otherwise occur in a configuration where the support deck includes a generally laterally continuous load engaging surface. In such arrangements deck support pieces may include longitudinally elongated cavities that include laterally spaced longitudinal gaps in a cargo supporting surface thereof. In such arrangements support members may be positioned in such cavities to provide additional strength and crush resistance to the load supporting deck while enabling substantial portions of the supported load to have the elongated gaps in underlying relation thereof. For example in some arrangements the deck support pieces previously described may be inverted to have elongated gaps underlying the load to achieve this configuration. Alternatively in other arrangements other configurations may be used.

Further exemplary arrangements may include other or additional features for providing weight savings for load supporting deck pieces. Such features may include, for example, different configurations of gaps which are included in the back surface or other surfaces so as to reduce the amount of material and weight thereof. Further other exemplary deck piece structures may include angled wall surfaces or other surface configurations that provide suitable support while reducing the amount of material and weight needed for the cargo supporting structure. Numerous different configurations and arrangements may be devised for different types of cargo supporting arrangements based on the teachings provided herein to produce suitable load supporting structures for the transport of various types of cargo by vehicles of various structures and arrangements.

Thus the exemplary embodiments described herein achieve improved operation, eliminate difficulties encountered in the use of prior devices and systems, and attain the useful results as described herein.

In the foregoing description, certain terms have been used for brevity, clarity and understanding. However, no unnecessary limitations are to be implied therefrom because such terms are used for descriptive purposes and are intended to be broadly construed. Moreover, the descriptions and illustrations herein are by way of examples and the new and useful concepts and structures are not limited to the features shown and described.

It should be understood that features and/or relationships associated with one embodiment may be combined with features and/or relationships of another embodiment. That is, various features and/or relationships from various embodiments can be combined in further embodiments. The inventive scope of the disclosure is not limited to only the embodiments shown or described herein.

Having described the features, discoveries and principles of the exemplary embodiments, the manner in which they are constructed and operated and the advantages and useful results attained; the new and useful features, devices, elements, arrangements, parts, combinations, systems, equipment, operations, methods, processes and relationships are set forth in the appended claim

We claim:
1. Apparatus comprising:
   a load support deck piece, wherein the load support deck piece is configured to support cargo carried by a cargo carrying vehicle,
   wherein the deck piece includes,
      at least one longitudinally elongated cavity,
         wherein each cavity in transverse cross section is bounded by at least one cavity wall,
      at least one longitudinally elongated support member,
         wherein each support member is selectively longitudinally positionable in a respective cavity,
      wherein the at least one support member in transverse cross section includes
         a central apex portion,
         two divergent legs, wherein each of the divergent legs extend outward from the apex portion,
         a central strut extending outward from the apex portion and at a common angle relative to each leg,
         wherein each of the legs and the central strut of each support member contact the at least one cavity wall of a respective cavity.

2. The apparatus according to claim 1
   wherein the at least one cavity wall in transverse cross section defines at least two corner recesses,
   wherein each respective one of the legs of the support member is in longitudinally movable contacting relation with the at least one cavity wall in a respective corner recess.

3. The apparatus according to claim 1
   wherein each cavity is generally rectangular in transverse cross section,
   wherein the at least one cavity wall of each respective cavity defines at least two corner recesses,
   wherein each respective one of the at least two legs of each support member contacts the at least one respective cavity wall in a respective corner recess.

4. The apparatus according to claim 2
   wherein the deck piece includes a plurality of laterally disposed rectangular cavities, wherein at least one cavity includes a respective longitudinally elongated gap intermediate of the corner recesses of the respective cavity.

5. The apparatus according to claim 1
wherein the deck piece includes a longitudinal end,
wherein each respective cavity includes a respective cavity opening at the longitudinal end,
wherein each respective support member is movably longitudinally insertable into the respective cavity through the respective cavity opening.

6. The apparatus according to claim 1 and further comprising a trailer, the trailer including a frame,
wherein the deck piece is in operative supported attached connection with the frame,
wherein the trailer includes a load area, wherein a load is normally applied to the deck piece in the load area, and wherein the at least one support member is selectively positioned in the at least one cavity in underlying relation of the load area.

7. Apparatus comprising:
a load support deck piece, wherein the load support deck piece is configured to support cargo carried by a cargo carrying vehicle,
wherein the deck piece includes,
at least one longitudinally elongated cavity,
wherein in transverse cross section
the deck piece includes a generally planar load engaging surface and a generally planar back surface,
each cavity extends within the deck piece intermediate of the load engaging surface and the back surface,
each cavity is generally rectangular and is bounded by at least one cavity wall, wherein the at least one cavity wall of each cavity defines at least two corner recesses, wherein the corner recesses are positioned closer to the back surface than the load engaging surface,
at least one longitudinally elongated support member,
wherein each support member is selectively longitudinally positionable in a respective cavity,
wherein each support member in transverse cross section includes at least two divergent legs,
wherein each respective one of the at least two legs of each support member is in longitudinally movable contacting relation with the at least one respective cavity wall in a respective corner recess.

8. The apparatus according to claim 7
wherein an elongated longitudinal gap extends in the back surface transversely and intermediate of the corner recesses.

9. Apparatus comprising:
a load support deck piece, wherein the load support deck piece is configured to support cargo carried by a cargo carrying vehicle,
wherein the deck piece includes,
a plurality of laterally disposed longitudinally elongated cavities,
wherein each cavity in transverse cross section is rectangular and bounded by at least one cavity wall,
wherein the at least one cavity wall in transverse cross section defines at least two corner recesses, and includes a respective longitudinally elongated gap intermediate of the corner recesses of the respective cavity,
at least one longitudinally elongated support member,
wherein each support member in transverse cross section includes
two divergent legs,
wherein the divergent legs of each support member extend from a central apex portion,
a central strut, wherein the central strut extends from the apex portion at a common angle relative to each of the legs, wherein the central strut is in contact with the at least one cavity wall bounding the respective cavity,
wherein each respective one of the legs of the support member is in longitudinally movable contacting relation with the at least one cavity wall in a respective corner recess.

10. The apparatus according to claim 9
wherein the at least one cavity wall bounding each respective cavity includes two further corner recesses, wherein each of the further corner recesses are disposed from each of the corner recesses that are in contact with a respective leg,
wherein the central strut contacts the at least one cavity wall transversely intermediate of the further corner recesses.

11. The apparatus according to claim 10
wherein the deck piece includes an end cavity, wherein in transverse cross section the end cavity extends at a lateral end of the deck piece intermediate of the load engaging surface and the back surface, wherein the end cavity is bounded in transverse cross section by an end wall that extends relative to the back surface at an obtuse angle and toward the load engaging surface.

12. The apparatus according to claim 11
wherein the deck piece includes a further end cavity,
wherein the further end cavity is disposed at an opposed lateral end from the end cavity,
wherein the further end cavity is bounded in transverse cross section by a further end wall that extends relative to the back surface at an obtuse angle and toward the load engaging surface.

13. The apparatus according to claim 12
wherein the end wall and the further end wall each include in transverse cross section a laterally extending projection,
wherein each laterally extending projection is configured to engage with a laterally extending projection of a laterally adjacent deck piece.

14. The apparatus according to claim 10 and further comprising:
a vehicle frame, wherein the vehicle frame includes a plurality of longitudinally disposed ribs,
wherein the deck piece is in operatively fixed connection with a plurality of the ribs,
wherein each of the plurality of ribs extend generally perpendicular and across the gaps.

15. The apparatus according to claim 14
and further including a trailer, wherein the trailer includes the vehicle frame and the deck piece,
wherein the trailer includes a load area on the load engaging surface, and
wherein the at least one cavity and the at least one support member underlie the load area.

16. The apparatus according to claim 15
wherein the deck piece has a longitudinal end,
wherein each respective cavity includes a respective cavity opening at the longitudinal end, wherein each respective support member is movably insertable into a respective cavity through the respective cavity opening.

17. Apparatus comprising:
a load support deck piece, wherein the load support deck piece is configured to support cargo carried by a cargo carrying vehicle,
wherein the deck piece includes
a longitudinally elongated cavity,
wherein the cavity is bounded by at least one cavity wall,
wherein in transverse cross section the at least one cavity wall,
defines at least two laterally disposed corners,
has at least one longitudinally elongated gap intermediate of the two corners,
includes a laterally extending surface bounding the cavity opposed of the gap,
a longitudinally extending support member extending in the cavity,
wherein the support member is longitudinally movably positionable within the cavity,
wherein the support member in transverse cross section includes,
a pair of divergent legs, wherein each leg includes an end in longitudinally movable engagement with the at least one wall in a respective corner,
a further end disposed laterally intermediate of both ends, in longitudinally movable engagement with the laterally extending surface.

18. The apparatus according to claim 17
wherein the support member includes an apex portion, wherein the divergent legs extend in a first direction from the apex portion.

19. The apparatus according to claim 18
wherein the support member includes a strut portion, wherein the strut portion extends in a second direction opposed of the first direction from the apex portion, wherein the strut portion terminates at the further end.

20. The apparatus according to claim 19
wherein the strut portion extends at a common angle relative to each of the legs.

21. The apparatus according to claim 17
wherein the deck piece in transverse cross section includes an end wall externally laterally bounding the deck piece,
wherein a longitudinally elongated lateral projection extends laterally outward from the end wall,
wherein the lateral projection is configured to engage a laterally adjacent deck piece.

22. Apparatus comprising:
a load support deck piece, wherein the load support deck piece is configured to support cargo carried by a cargo carrying vehicle,
wherein the deck piece includes,
a generally planar load engaging surface, and
a generally planar back surface disposed from the load engaging surface,
at least one longitudinally elongated cavity,
wherein the at least one cavity includes a longitudinally elongated gap,
wherein the elongated gap extends through the back surface and into the respective cavity,
wherein each respective cavity in transverse cross section is bounded by at least one respective cavity wall,
at least one longitudinally elongated support member,
wherein each support member is selectively longitudinally positionable in a respective cavity,
wherein each support member in transverse cross section includes at least two divergent legs,
wherein in transverse cross section the at least one cavity and the at least one support member extend intermediate of the load engaging surface and the back surface,
and wherein each of the at least two legs of the respective support member in the respective cavity is in movable contact with the at least one cavity wall in a plurality of locations disposed away from the gap.

23. Apparatus comprising:
a load support deck piece, wherein the load support deck piece is configured to support cargo carried by a cargo carrying vehicle,
wherein the deck piece includes,
a generally planar load engaging surface,
a generally planar back surface disposed from the load engaging surface,
at least one longitudinally elongated cavity,
wherein each cavity in transverse cross section is bounded by at least one cavity wall,
an end cavity on a lateral side thereof,
wherein in transverse cross section the end cavity extends intermediate of the load engaging surface and the back surface, and wherein the end cavity is bounded by an end wall that extends relative to the back surface at an obtuse angle and toward the load engaging surface,
at least one longitudinally elongated support member,
wherein each support member is selectively longitudinally positionable in a respective cavity,
wherein each support member in transverse cross section includes at least two divergent legs,
wherein each of the at least two divergent legs is in longitudinally movable contacting relation with the at least one cavity wall,
wherein in transverse cross section the at least one cavity and support members extends intermediate of the load engaging surface and the back surface.

24. Apparatus comprising:
a load support deck piece, wherein the load support deck piece is configured to support cargo carried by a cargo carrying vehicle,
wherein the deck piece includes
in transverse cross-section, a generally planar horizontally extending load engaging surface and a generally planar horizontally extending back surface,
at least one longitudinally elongated cavity,
wherein each cavity extends within the deck piece intermediate of the load engaging surface and the back surface,
wherein each cavity in transverse cross-section is bounded by at least one cavity wall,
wherein each at least one cavity wall in transverse cross-section defines two transversely spaced lower corner recesses,
wherein the deck piece includes at least one elongated longitudinal gap,
wherein each at least one longitudinal gap extends through the generally planar back surface to a respective cavity, and wherein in transverse cross-section each gap is positioned intermediate of the lower corner recesses of the respective cavity,
at least one longitudinally elongated support member, wherein each support member is selectively longitudinally positionable in a respective cavity,
wherein each support member in transverse cross-section includes two downward extending divergent legs, wherein each leg terminates downward at a respective leg end,
wherein each respective leg end is in longitudinally contacting relation with the at least one cavity wall of the respective cavity in a respective lower corner recess.

* * * * *